(12) United States Patent
Al Ghatta et al.

(10) Patent No.: US 6,696,146 B1
(45) Date of Patent: Feb. 24, 2004

(54) MONO-OR BIAXIALLY-STRETCHED POLYESTER RESIN FOAMED SHEETS AND FILMS

(75) Inventors: Hussein Al Ghatta, Fiuggi (IT); Sandro Cobror, Pozzilli (IT); Tonino Severini, Colleferro (IT)

(73) Assignee: Sinco Ricerche S.p.A., Verbania Pallanza (IT)

( * ) Notice: Subject to any disclaimer, the term of this patent is extended or adjusted under 35 U.S.C. 154(b) by 0 days.

(21) Appl. No.: 09/531,478

(22) Filed: Mar. 20, 2000

(51) Int. Cl.$^7$ .............................. B32B 5/22; B29C 71/00
(52) U.S. Cl. ..................... 428/317.9; 521/84.1; 521/97; 528/308.2; 264/235.8; 264/290.2; 264/41
(58) Field of Search ...................... 428/319.7; 521/84.1, 521/97; 528/308.2; 264/235.8, 290.2, 41

(56) References Cited

U.S. PATENT DOCUMENTS 5,000,991 A * 3/1991 Hayashi et al. ............... 264/41
5,362,763 A * 11/1994 Al Ghatta et al. ............ 264/50
6,472,035 B1 * 10/2002 Al Ghatta et al. .......... 428/36.5

FOREIGN PATENT DOCUMENTS

EP 0 911 150 4/1999

* cited by examiner

Primary Examiner—Elizabeth M. Cole
Assistant Examiner—Hai Vo
(74) Attorney, Agent, or Firm—Guido Modiano; Albert Josif; Daniel O'Byrne

(57) ABSTRACT

Mono- or biaxially-stretched polyester resin foamed sheets and films wherein the polyester resin has a melt strength of more than 1 centinewton at 280° C., a melt viscosity of at least 1500 Pa.s at 280° C. for a shear ratio which tends to zero and a crystallization rate such that for a 10-minute heating at 120° C. the crystallinity can reach values as high as 30–35%.

11 Claims, No Drawings

MONO- OR BIAXIALLY-STRETCHED POLYESTER RESIN FOAMED SHEETS AND FILMS

BACKGROUND OF THE INVENTION

Polyester resin films are widely used in various technological fields by virtue of their excellent mechanical, electrical and chemical-resistance properties.

In particular, biaxially-stretched films of polyethylene terephthalate are superior to other films both in terms of dimensional stability and in terms of tensile properties, particularly in view of their high modulus of elasticity.

However, polyester films have drawbacks, mainly due to their very high relative density and to the fact that applications in the field of information technology, such as for example for electronic whiteboards and similar devices require them to be highly loaded with white pigments in order to be sufficiently opaque. Various methods for producing foamed films or sheets of polyester resin are known.

Thick low-density foamed materials made of polyester resin, due to their high thermal insulation properties, which prevent effective cooling of the internal parts of the materials as they exit from the extruders, have a relatively high crystallinity which is difficult to reduce.

No solution has been found so far to the problem of being able to mono- or biaxially stretch foamed sheets made of polyester resin, which have a density of less than 600–700 kg/m$^3$ and have crystallinity or are crystallizable.

The main difficulty encountered in the mono- and biaxial stretching of said low-density foamed sheets consists in the possibility of their breaking during stretching.

It is known from WO 97/33948 to produce labels from polyester foamed films which may also be mono or biaxially stretched when obtained from amorphous resins such as poly(1,4-dimethylolcyclohexile)terephthate or amorphous copolyethylene terephthate-isophthalate.

The possibility to have mono- and biaxially-stretched polyester-resin foamed sheets or films having low apparent density and sufficiently high crystallinity might offer considerable advantage, especially in the view of the improved mechanical properties that said sheets and films might have.

BRIEF DESCRIPTION OF THE INVENTION

It has now been found unexpectedly that it is possible to mono- and biaxially stretch, without rupture problems or other drawbacks, foamed aromatic polyester resin sheets and films having a bulk density of less than 700 kg/m$^3$, preferably less than 400 kg/m$^3$, in which the resin has a crystallization rate such that by heating for 10 minutes at 120° C. the crystallinity can reach values as high as 30–35%, and to obtain stretched sheets or films having a relatively low apparent density which have high mechanical properties, particularly in terms of high modulus and high impact resistance and good opacity or translucence associated with sparkling reflectance properties.

DETAILED DESCRIPTION OF THE INVENTION

Preferably, the crystallinity that can be developed by heating at 120° C. for 10 minutes is from 5 to 35%.

The high impact resistance of the resulting stretched sheets or films is surprising being considerably higher than that of the sheets and films before stretching.

It has been found that the mono- and biaxial stretching of foamed sheets having the above indicated thickness, crystallinity and density characteristics is feasible if said sheets are obtained from polyester resin having sufficiently high melt strength and melt viscosity values which are higher than certain given limit values.

The melt strength of the usable resin is at least 1 centinewton at 280° C. and melt viscosity is at least 1500 Pa.s at 280° C. with a shear rate which tends to zero.

Melt strengths of 10 to 150 or more centinewtons and melt viscosities of 2,000–20,000 Pa.s can be used conveniently.

The melt strength measured on the resin forming the foamed sheets or films presents value lower than those of the resin used in for preparing the sheets and films.

The intrinsic viscosity is generally between 0.8 and 1.5 dl/g.

The above specified rheological properties refer to the resin before it is subjected to the extrusion-foaming process, but they can be acquired during said process.

The aromatic polyester resins usable to obtain the resins having the above specified rheological properties are prepared by polycondensation, according to known methods, of dicarboxylic aromatic acids with diols containing 2 to 12 carbon atoms or by transesterification of lower alkyl esters of dicarboxylic acids with diols having 2–12 carbon atoms and subsequent polycondensation of the diol esters.

Terephthalic acid, isophthalic acid and naphthalene dicarboxylic acids are preferred aromatic acids.

Polyethylene terephthalate and copolymers thereof in which 1 and up to 20–25 and preferably 1–25 monomeric units derived from terephthalic acid are substituted with units derived from isophthalic acid and/or naphthalene dicarboxylic acids are preferred resins.

The polyester resins having the above specified rheological properties can preferably be obtained by solid-state polycondensation (SSP) of polyester resins having an intrinsic viscosity of less than about 0.7 dl/g added with a dianhydride of a preferably aromatic tetracarboxylic acid, particularly pyromellitic dianhydride, in an amount of 0.05 to 2% by weight, working under such temperature conditions and with such durations as to increase the melt strength and the melt viscosity of the resin to the chosen values.

The intrinsic viscosity of the resin after SSP is generally increased to values of more than 0.8 dl/g.

The above indicated solid-state polycondensation is performed according to known methods.

A particularly suitable method is described in U.S. Pat. No. 5,243,000, whose description is included herein by reference.

Other methods suitable to obtain the melt strength and melt viscosity values according to the invention are disclosed in U.S. Pat. Nos. 5,288,764 and 5,229,432, whose description also is included by reference.

The polyester resins can be used in mixture with other thermoplastic polymers, particularly with polyamide resins used in an amount from approximately 2 to 50% by weight. Mixtures or alloys of this type are described in WO 94/09069, whose preparation method is included herein by reference.

A polyamide which is particularly suitable especially when one wishes to give improved gas-barrier properties (oxygen and $CO_2$) is poly-m-xylilene adipamide.

This polyamide is mixed while melted with the polyester resin, which is premixed, also while melted, with a dianhydride of a tetracarboxylic aromatic acid, particularly pyromellitic dianhydride, used in an amount from 0.05 to 2% by weight on the polyester resin.

Other polymers that can be used are aliphatic polyester resins obtainable from aliphatic dicarboxylic acids and from diols or from aliphatic hydroxides-acids or from the corresponding lactones or lactides.

Poly-epsilon-propiolactone is a representative resin.

These resins are added in amounts of up to 40% by weight and give biodegradability properties to the resin thus mixed.

Another aspect of the invention is the finding that the addition of amounts between 0.5 and 10% by weight to the polyester resin of an aliphatic or aromatic polyamide with a high or low molecular mass allows to significantly reduce the amount of the unreacted pyromellitic dianhydride present in the stretched and foamed sheets and films and the amount of acetaldehyde.

The foamed sheets suitable for being mono- and biaxially stretched have a bulk density of about 50 to 700 kg/m$^3$. Thickness is generally form 0.5 to 5 mm.

To produce the monoaxially-stretched foamed films with a thickness reduced to approximately 30 microns, the thickness of the starting foamed sheets is from about 0.6 to 2 mm; when instead one wishes to obtain biaxially-stretched sheets, one begins with thicker sheets (2–5 mm).

In the case of biaxial stretching, the bulk density after stretching is increased considerably (even fourfold for 4:1 stretching).

However, when a hydrocarbon is used as foaming agent, the residual hydrocarbon enclosed within the cells expands due to the heating required to bring the sheet or film to the temperature suitable for stretching. It is thus possible to obtain biaxially-stretched sheets or films with a density which is lower than before stretching.

In the case of monoaxial stretching, density is generally reduced (this is due to the different apparatus used in monoaxial stretching with respect to biaxial stretching).

In both cases, one works so as to have a density of preferably less than 500 kg/m$^3$ after stretching.

The average size of the cells in the starting foamed materials can vary from 0.01 to 1 mm according to the conditions used in the extrusion foaming process, such as for example the type of nucleating agent and foaming agent and the amounts used.

Values of 0.2–0.4 mm are representative.

The average size of the cells in the sheets and films after biaxial stretching is increased with respect to the size before stretching: in monoaxial stretching, the cells are elongated.

Biaxial stretching is performed according to conventional methods, working at temperatures which are higher than the Tg of the polyester resin but lower than the melting point.

Temperatures of 80 to 120° C. are suitable: residence times during stretching range from a few seconds to 40 or more.

The crystallinity of the sheet and film before stretching is kept low enough in order to be able to easily perform stretching (preferably lower than 10%).

The biaxial stretch ratio in both directions is generally from 1.5:1 to 5:1 and preferably up to 3:1 and stretching in the two directions can be performed simultaneously or sequentially.

Monoaxial stretching is performed either in the direction of the machine or transversely. The stretch ratio is generally from 1.1:1 to 4:1.

Stretching is generally performed on a series of calendering units heated to 95°–110° C. which rotate at different speeds.

In many cases it is advantageous to subject the biaxially- and monoaxially-stretched material to a heat-stabilization treatment, working at temperatures between for example 160° and 220° C. for a few seconds (generally 10–120 seconds).

The treatment allows to achieve good dimensional stabilization of the material and improve its mechanical properties.

The heat set material has relatively low heat-shrinkage values with respect to the unstabilized material (less than 5% heat shrinkage at, for example, 180° C. for a few minutes).

Crystallinity after stretching is higher than before stretching; it can reach values of 30% and more in the case of stretched sheets and films subjected to heat-setting treatment.

As noted, the mechanical properties of the mono- and biaxially-stretched foamed sheets and films are considerably improved with respect to before stretching.

The modulus of elasticity and impact resistance are particularly high.

For example, in the case of a biaxially-stretched film with a thickness of 40 microns, the modulus can reach 2 GPa or more; the ultimate tensile strength is 50–60 MPa and breaking elongation is 50%.

The opacity of the stretched material is high, generally from 40% to 80% in the case of the biaxially stretched film. The gloss characteristics are improved considerably with respect to the unstretched foamed material. The translucent sheets, particularly those biaxially stretched present a sparkling reflectance involving the whole sheet, which renders the sheets particularly suitable for applications such as the holographic printing.

The mono- and biaxially-stretched sheets or films according to the invention are characterized by a high level of heat-shrinkage. For example, a biaxially-stretched film with a thickness of 0.04 mm and with a stretch ratio of 3:1 exhibits a shrinkage of 20–30% when heated to 180° C. for a few minutes. This property is utilized for many applications, particularly for labeling polyester resin bottles in which the label is made to adhere to the bottle by virtue of the shrinkage that said label undergoes when the bottle is heated.

By virtue of their flexibility, breathability and high permeability to water vapor, the mono- and biaxially-stretched sheets or films are used in particular in the textile field.

Their easy inking furthermore makes them particularly suitable in applications for replacing paper or cardboard.

The mono- and biaxially-stretched sheets and films can furthermore be included in multilayer materials in which a layer constituted for example by polyester resin reinforced with glass fibers or by a low-melting polyester resin or by other materials is adjacent on one or both sides of the stretched sheet or film.

The low-melting polyester is generally a copolyethylene terephthalate/isophthalate which contains more than 7% in moles of isophthalic acid units.

The multilayer material can be prepared both by coextruding from a battery of extruders the resin to be foamed and the resin or resins that form the adjacent layers and by then stretching the resulting multilayer material, or by gluing one or more layer of other materials to the foamed sheet or film or by making them adhere to said sheet or film.

Finally, the high opacity of the biaxially-stretched foamed films and sheets and their high-level mechanical properties make them particularly suitable for applications in information technology and photography.

Other applications not mentioned here can be evident to the skilled person.

EXAMPLES

The following examples are given to illustrate the invention but without limiting the scope of the same.

Measurement Methods

Intrinsic viscosity was measured in a 60/40 solution by weight of phenol and tetrachloroethane at 25° C. according to ASTM D 4603-86.

Rheological measurements were performed according to the ASTM D 3835 standard, using a Goettfert rheometer at 280° C.

Melt strength was determined by measuring the force in cN (centinewtons) required to stretch the material extruded from the capillary of a Goettfert Rheograph 2002 rheometer.

For measurement, a Rheotens unit was applied to the outlet of the capillary of a Goettfert Rheograph 2002 rheometer.

The extrusion conditions were as follows:

piston speed: 0.2 mm/sec die diameter: 2 mm capillary length: 30 mm test temperature: 280° C.

The measurements were performed by setting an acceleration of 2.4 $cm/sec^2$.

Each measurement was repeated, taking the average of the two measurements.

The percentage of crystallinity was determined by horizontal ATR (attenuated total relectance) from the ratio between the trans and gauche configuration, which can be correlated to the percentage of crystallinity of the polyethylene terephthalate (the amorphous phase can be correlated to the gauche configuration, whereas the crystalline one can be correlated to the trans configuration).

The ATR instrument was fitted to a Perkin model 2000 FT-IR and the measurements were conducted with a resolution of 8 $cm^{-1}$, accumulating 16 scans for the sake of better definition.

Instrument calibration was performed with a sample of PET whose crystallinity content was determined with the conventional density-column method and was between 7 and 65%.

The correlation coefficient was higher than 0.98.

Absorption at 1410 $cm^{-1}$ was used as reference band.

Example 1

90 kg/h of polyethylene terephthalate copolymer containing 2% isophthalic acid (IPA) with a melt strength of 150 centinewtons at 280° C., a melt viscosity of 1800 PA.S at 300° C. and 10 rad/second, an intrinsic viscosity of 1.24 dl/g and a crystallization peak in the melted-state DSC curve (cooling rate 5EC/min) at 191EC with a delta H of 34 J/g, obtained by regrading the polymer at 210° C. in the presence of 0.4% PMDA, were fed continuously into a twin-screw extruder with a screw diameter of 90 mm.

A static mixer was placed downstream of the screws in order to improve the homogenization of the various components of the mixture.

The temperatures set on the extruder were 280° C. in the melting region, 280° C. in the compression region, 270° C. in the mixing region and 265° C. on the extrusion head.

The screws of the extruder turned at 18 rpm.

3.6% by weight of nitrogen gas (foaming agent) was added to the resin in the region of the extruder located after polymer melting, thoroughly mixed in with the polymeric matrix and then cooled.

The resin/nitrogen composition, once mixed and cooled, was extruded through an annular head having a diameter of 60 mm and an extrusion outlet measuring 0.29 mm.

Downstream of the extrusion head there is a cooled sizing mandrel which has a diameter of 200 mm, a length of 750 mm and is cooled with water at 20° C.

Once the foamed material has left the die, it is fitted onto the mandrel, cut, pulled and then wound onto a roll at the speed of 5 meters per minute by a winder for producing bobbins.

The sheet had the following characteristics:

| | |
|---|---|
| density: | 0.400 $g/cm^3$ |
| thickness: | 0.7 mm |
| average cell diameter: | 230 microns |
| degree of crystallization: | 8% |

The sheet was subjected to simultaneous biaxial stretching in both directions at 100° C. with a stretch ratio of 3:1 in both directions. Table 1 lists some properties of the sheet before and after stretching.

The opacity of the sheet after stretching was 70%; before stretching it was 92%.

Gloss at 20° C. after stretching was 32% and 109% at 60° C.

The corresponding values for the unstretched sheet were 7.5% and 28%.

Example 2

The procedure of Example 1 was repeated, the only difference being that the extrusion head had an outlet measuring 0.35 mm instead of 0.29 mm and that the foamed material was collected onto the roll at the speed of 3.9 m per minute.

Biaxial stretching was performed at 110° C., using a stretch ratio of 3:1 and 4:1. Table 1 lists the properties of the sheet before and after stretching.

Example 3

The procedure of Example 2 was repeated, the only difference being that n-pentane, in an amount equal to 1.8% by weight, was use as foaming agent.

The resulting sheet had the following characteristics:

| | |
|---|---|
| density: | 0.148 $g/cm^3$ |
| thickness: | 1.4 mm |
| average cell diameter: | 300 microns |
| degree of crystallization: | 8% |

Example 4

The procedure of Example 1 was repeated, the only difference being that $CO_2$ in an amount equal to 2.4% by weight was used as foaming agent.

The resulting sheet had the following characteristics:

| | |
|---|---|
| density: | 0.280 g/cm3 |
| thickness: | 1 mm |
| average cell diameter: | 220 microns |
| degree of crystallization: | 8% |

The mechanical properties of the sheet after biaxial stretching at 100° C., with a stretch ratio of 3:1, were similar to those of the sheet after stretching in Example 1.

Example 5

The same procedure as Example 1 was followed, the only difference being that copoethylene terephthalate containing 7.5% IPA, showing an endothermic peak at 160° C. with delta entholpy of 24 j/g in the DSC curve from the melt with a cooling rate of 5° C./min, was used.

The resulting sheet had the following characteristics:

| | |
|---|---|
| density: | 0.395 g/cm$^3$ |
| thickness: | 1.2 mm |
| average cell diameter: | 208 microns |
| degree of crystallization: | 8% |

The sheet was subjected to biaxial stretching at 100° C. with a stretch ratio of 3:1 in both directions.

The thickness of the stretched sheet was 0.04 mm; density was 910 kg/M$^3$; opacity was 75%.

Example 6

The stretched sheet of Example 2 (stretch ratio of 3:1) was subjected to a thermal stabilization treatment at 210° C. for 10 seconds. The modulus of elasticity was 1.2 GPa, the ultimate tensile strength was 29 MPa and breaking elongation was 33%.

The content of free (unreacted) PMDA was 2 ppm; the acetaldehyde content was 2–3 ppm.

Example 8

The preparation of Example 1 is repeated, expected that PET homopolymer was used, having the melt strength and melt viscosity characteristics described in Example 1 and showing, in the DSC curve from the melt with a cooling rate of 5EC/min, an endothermal peak at 201° C. with a delta entholpy of 38 j/g, and that nitrogen (foaming agent) was used in an amount equal to 1.3% by weight. The resulting sheet had the following properties:

| | |
|---|---|
| density: | 0.450 g/cm$^3$ |
| thickness: | 1.1 mm |
| average cell diameter: | 300 microns |
| degree of crystallization: | 8% |

The sheet was subjected to stretching, performed on a series of calendering units heated to 95EC and rotating at different speeds.

The results of vertical impact tests using a Franctovis Ceast impactor (an impact testing device) are given in Table 2 in relation to the stretch ratio used (stretch in the direction of the machine).

| Specimen | Density kg/m$^3$ | Thickness mm | Impact strength J/m | Peak energy J | Total energy J |
|---|---|---|---|---|---|
| as is (unstretched) | 450 | 1.1 | 407 | 0.38 | 0.41 |
| Stretched 1.1:1 | 375 | 0.7 | 840 | 0.48 | 0.59 |
| Stretched 3:1 | 380 | 0.4 | 1030 | 0.3 | 0.41 |
| Stretched 4:1 | 330 | 0.25 | 1225 | 0.24 | 0.31 |

By way of comparison, a specimen with a thickness of 0.45 mm obtained from a commercially available fruit

TABLE 1

| Example | Specimen | Bulk density (kg/m$^3$) | Thickness (mm) | Biaxial stretch ratio | Module (GPa) | Ultimate tensile strength (MPa) | Elongation (%) |
|---|---|---|---|---|---|---|---|
| 1 | as is | 400 | 0.7 | | 0.8 | 12 | 154 |
| | stretched | 985 | 0.04 | 3:1 | 2 | 56 | 49 |
| 2 | as is | 400 | 1.4 | | 0.5 | 9 | 173 |
| | stretched | 533 | 0.13 | 3:1 | 1 | 28 | 35 |
| | | 710 | 0.06 | 4:1 | 1.6 | 47 | 22 |
| 3 | as is | 148 | 1.4 | | 0.2 | 4 | 18 |
| | stretched | 70 | 0.42 | 3:1 | 1 | 30 | 2 |

Note: the mechanical properties refer to the machine direction.

Example 7

The preparation of Example 1 was repeated, the only difference being that 2.5% by weight of poly m-xylilene adipamide (Mitsubishi Gas Chemicals, Japan, poly MXD-6 6121) was fed in addition to the copolyethylene terephthalate and PMDA used in Example 1. The oxygen permeability of the sheet, stretched biaxially with a stretch ratio of 3:1 in both directions and having a thickness of 0.04 mm, was 80 ml/m$^2$/day, whereas the permeability of the sheet that did not contain poly MXD6 was 96 (before stretching, permeability was 13 for the sheet containing poly MXD-6 and 15 for the sheet that did not contain the polyamide).

container based on polyethylene-treated cardboard yielded a peak energy value (the energy at which fracture begins to appear) of 0.16 J and the total energy corresponded to the perforation energy of the specimen after the impact of 0.5 J.

The disclosures in Italian Patent Application No. MI99A001139 and in E.P.A. No. 99122046.8 from which this application claims priority are incorporated herein by reference.

What is claimed is:

1. Foamed sheets and films obtained by monoaxially or biaxially streching foamed aromatic polyester resin sheets and films wherein the resin has melt strength of more than 1 centinewton at 280° C., melt viscosity of at least 1500 Pa.s at 280° C. for a shear rate ratio which tends to zero and a crystallization rate of the resin such that for 10-minute heating at 120° C. the crystallinity can reach values of 30–35%, the biaxial streching being carried out at a temperature higher than the Tg of the resin but lower than its melting point, using stretch ratios of 1.1:1 to 5:1, the monoaxial streching being carried out at 85–110° C. using stretch ratios 1.1:1 to 4:1.

2. A multilayer material comprising a sheet or film according to claim 1 and one or more layers of different material which adhere to one or both sides of the foamed sheet or film.

3. Mono- or biaxially-stretched foamed sheets and films obtained from foamed aromatic polyester resin sheets and films having melt strength of more than 1 centinewton at 280° C., melt viscosity of at least 1500 Pa.s at 280° C. for a shear rate ratio which tends to zero and a crystallization rate of the resin such that for 10-minute heating at 120° C. the crystallinity can reach values of 30–35%, wherein the polyester resin is mixed with 0.5–10% polyamide by weight of the polyester resin.

4. Sheets and films according to claim 3, wherein the polyamide is poly m-xylilene adipamide.

5. Sheets and films according to claim 1 or 3, subjected to a heat-setting treatment.

6. A method for preparing the sheets and films according to claim 1 or 5, comprising a stage in which mono- or biaxial stretching is performed on a foamed sheet of polyester resin having a density of 60 to 700 kg/m$^3$ and in which the resin has a crystallization rate such that by heating to 120° C. for 10 minutes the crystallinity can reach values of up to 30–35%, a melt strength greater than 1 centinewton at 280° C. and a melt viscosity of at least 1500 Pa.s at 280° C. for a shear rate that tends to zero, and wherein the biaxial stretching is performed by using ratios from 1.1:1 to 5:1 and the monoaxial stretching with ratios of 1.1:1 to 4:1.

7. Manufactured articles obtained from the sheets or films of claim 1 or 3.

8. A muitilayer material comprising a sheet or film according to claim 5 and one or more layers of different material which adhere to one or both sides of the foamed sheet or film.

9. A multilayer material according to claim 8, wherein at least one layer which adheres to the foamed sheet or film is copolyethylene terephthalate-isophthalate containing 2–15% in moles of monomeric units derived from isophthalic acid.

10. Foamed sheets and films according to claim 1, wherein the polyamide is poly m(xylilen)adipamide.

11. A multilayer material comprising a mono- or biaxially-stretched foamed sheet and film obtained from foamed aromatic polyester resin sheets and films having melt strength of more than 1 centinewton at 280° C., melt viscosity of at least 1500 Pa.s at 280° C. for a shear rate ratio which tends to zero and a crystallization rate of the resin such that for 10-minute heating at 120° C. the crystallinity can reach values of 30–35%, and one or more layers of different material which adhere to one or both sides of the foamed sheet or film, wherein at least one layer which adheres to the foamed sheet or film is copolyethylene terephthalate-isophthalate containing 2–15% in moles of monomeric units derived from isophthalic acid.

* * * * *